| United States Patent [19] | [11] 3,903,077 |
|---|---|
| Jones et al. | [45] Sept. 2, 1975 |

[54] DIRECT SYNTHESIS OF DOPAMINE AMINO ACID AMIDES

[75] Inventors: Peter Hadley Jones, Lake Forest; Carroll Wayne Ours, Zion; Robert Roteman, Waukegan, all of Ill.

[73] Assignee: Abbott Laboratories, North Chicago, Ill.

[22] Filed: Apr. 5, 1973

[21] Appl. No.: 348,440

[52] U.S. Cl.... 260/239 A; 260/239 BF; 260/268 R; 260/297.76; 260/309; 260/326.14 T; 260/326.47; 260/519; 260/558 A; 260/559 A; 260/562 N
[51] Int. Cl.² .................................. C07D 205/04
[58] Field of Search ....... 260/472, 268 R, 326.14 T, 260/326.47, 309, 558 A, 559 A, 562 A, 562 S, 519, 239 BF, 239 A, 297.76

[56] References Cited
UNITED STATES PATENTS
3,676,492   7/1972   Biel et al............................ 260/519

*Primary Examiner*—Lorraine A. Weinberger
*Assistant Examiner*—L. A. Thaxton
*Attorney, Agent, or Firm*—Vincent A. Mallare; Robert L. Niblack

[57] ABSTRACT

An improved process for synthesizing amino acid amides of dopamine comprising reacting an active ester of an appropriate N-carbobenzyloxy amino acid directly with a dopamine salt. The amino acid amides of dopamine are useful as renal vasodilators and antihypertensive agents.

3 Claims, No Drawings

DIRECT SYNTHESIS OF DOPAMINE AMINO ACID AMIDES

This invention relates to an improved process for synthesizing amino acid amides of dopamine.

Dopamine has been reported to be useful in treating congestive heart failure and shock. However, dopamine was believed to be active solely by the intravenous route of administration and various investigators have developed derivatives of dopamine which are orally active and longer acting than dopamine. One such class of compounds are the amino acid amides of dopamine which are useful as renal vasodilators and antihypertensive agents. (See U.S. Pat. No. 3,676,492).

While the amino acid amides of dopamine are excellent renal vasodilators and antihypertensive agents, their synthesis has been both difficult and expensive.

In U.S. Pat. No. 3,676,492, amino acid amides of dopamine, represented by the formula

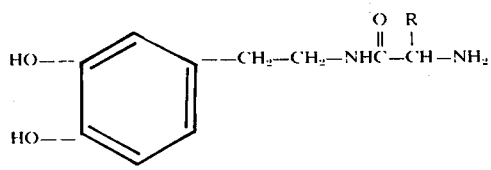

wherein R is hydrogen, loweralkyl, hydroxymethyl, hydroxybenzyl, $\beta$-hydroxyethyl, mercaptomethyl, methylmercaptoethyl, 3-indolylmethyl, carboxymethyl, $\beta$-carboxyethyl, $\gamma$-guanidinopropyl, $\Delta$-aminobutyl, or 5-imidazolylmethyl are prepared by reacting dibenzyloxyphenethylamine, or a salt thereof, with the desired N-carbobenzyloxyamino acid to obtain the protected N-carbobenzyloxy-amino acid amide of 3,4-dibenzyloxy-$\beta$-phenethylamine which is then reduced to the 3,4-dihydroxy amino acid amide.

We have found that higher yields are obtained and greater ease of preparation is encountered by preparing an active ester of the desired N-carbobenzyloxy amino acid and reacting it directly with a salt of dopamine (3,4-dihydroxyphenethylamine). The coupling reaction is essentially quantitative, and reduction to cleave off the carbobenzyloxy protecting group yields essentially a quantitative recovery of the desired amino acid amide of dopamine (yields are generally better then 90 percent).

This is totally surprising as it was previously thought that the 3,4-dihydroxy groups of dopamine had to be protected prior to the coupling step with the appropriate amino acid.

The method of this invention also yields a high purity carbobenzyloxy intermediate, which leads to a pure final product. In the prior art process, temperatures have to be carefully controlled to prevent racemization, and carbobenzyloxyamide impurities are obtained in the final product. The present invention, in addition to the above mentioned advantages, eliminates the racemization problem as well as the carbobenzyloxy impurity problem.

Accordingly, amino acid amides of dopamine, represented by the formula

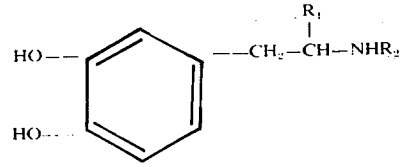

wherein $R_1$ is hydrogen or loweralkyl and $R_2$ is an amino acid selected from the group consisting of $\beta$-alanine, $\beta$-methylalanine, phenylalanine, 3,4-dihydroxyphenylalanine, 4-chlorophenylalanine, glycine, tyrosine, valine, leucine, iso-leucine, serine, threonine, cysteine, methionine, tryptophane, aspartic acid, glutamine, arginine, lysine, histidine, $\gamma$-aminobutyric acid, pyroglutamic acid, alanine, proline, sarcosine, N-methylpiperazinobutyric acid, or

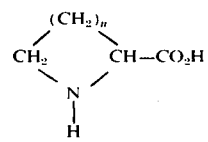

wherein $n$ is an integer from 1 to 4, can advantageously be prepared by reacting an activated ester, such as the N-hydroxysuccimide ester of an N-carbobenzyloxy amino acid with dopamine or a salt of dopamine, such as dopamine hydrochloride, at a temperature of from about 20° to about 50°C. for from about 3 to about 20 hours to obtain the N-carbobenzyloxy amino acid amide of dopamine. The protecting group is then cleaved in the conventional method, by, for example, hydrogen reduction. The preferred reaction conditions for the direct coupling step are 40°C. for at least 16 hours. By starting with the appropriate d-, l-, or dl- amino acid, the corresponding d-, l-, or dl- amino acid amide is obtained.

Representative compounds which can be prepared by the process of this invention include:

N-3',4'-Dihydroxy-$\beta$-phenethyl-L-3,4-dihydroxyphenylalanine amide

N-3',4'-Dihydroxy-$\beta$-phenethyl-L-alanine amide

N-3',4'-Dihydroxy-$\alpha$-methyl-$\beta$-phenethyl-L-alanine amide

N-3',4'-Dihydroxy-$\beta$-phenethyl-L-tyrosine amide

N-3',4'-Dihydroxy-$\alpha$-methyl-$\beta$-phenethyl-L-tyrosine amide

N-3',4'-Dihydroxy-$\beta$-phenethyl glycine amide

N-3',4'-Dihydroxy-$\alpha$-methyl-$\beta$-phenethyl glycine amide

N-3',4'-Dihydroxy-$\beta$-phenethyl-DL-valine amide hydrochloride

N-3',4'-Dihydroxy-$\alpha$-methyl-$\beta$-phenethyl-DL-valine amide hydrochloride N-3',4'-Dihydroxy-$\beta$-phenethyl-D-isoleucine amide oxalate N-3',4'-Dihydroxy-$\alpha$-methyl-$\beta$-phenethyl-D-isoleucine amide oxalate N-3',4'-Dihydroxy-$\beta$-phenethyl-L-leucine amide tartrate N-3',4'-Dihydroxy-$\alpha$-methyl-$\beta$-phenethyl-L-leucine amide tartrate N-3',4'-Dihydroxy-$\beta$-phenethyl-L-phenylalanine amide N-3',4'-Dihydroxy-$\alpha$-methyl-$\beta$-phenethyl-L-phenylalanine amide N-3',4'-Dihydroxy-$\beta$-phenethyl-D-serine amide sulfate N-3',4'-Dihydroxy-α-methyl-β-phenethyl-D-serine amide sulfate
N-3',4'-Dihydroxy-β-phenethyl-L-threonine amide
N-3',4'-Dihydroxy-α-methyl-β-phenethyl-L-threonine amide
N-3',4'-Dihydroxy-β-phenethyl-L-cysteine amide
N-3',4'-Dihydroxy-α-methyl-β-phenethyl-L-cysteine amide
N-3',4'-Dihydroxy-β-phenethyl-DL-methionine amide
N-3',4'-Dihydroxy-α-methyl-β-phenethyl-DL-methionine amide
N-3',4'-Dihydroxy-β-phenethyl-L-tryptophane amide
N-3',4'-Dihydroxy-α-methyl-β-phenethyl-L-tryptophane amide
N-3',4'-Dihydroxy-β-phenethyl-D-aspartylamide tosylate
N-3',4'-Dihydroxy-α-methyl-β-phenethyl-D-aspartylamide tosylate
N-3',4'-Dihydroxy-β-phenethyl-DL-glutamylamide
N-3',4'-Dihydroxy-α-methyl-β-phenethyl-DL-glutamylamide
N-3',4'-Dihydroxy-β-phenethyl-L-arginine amide
N-3',4'-Dihydroxy-α-methyl-β-phenethyl-L-arginine amide
N-3',4'-Dihydroxy-α-isopropyl-β-phenethyl-DL-arginine amide
N-3',4'-Dihydroxy-β-phenethyl-D-lysine amide
N-3',4'-Dihydroxy-α-methyl-β-phenethyl-D-lysine amide
N-3',4'-Dihydroxy-β-phenethyl-DL-histidine amide
N-3',4'-Dihydroxy-α-methyl-β-phenethyl-DL-histidine amide
N-3',4'-Dihydroxy-β-phenethyl-DL-4-chlorophenylalanine amide
N-3',4'-Dihydroxy-α-methyl-β-phenethyl-DL-4-chlorophenylalanine amide The activated esters can be prepared according to the procedure set forth in J.A.C.S. 86, 1839 (1964) or Japanese Pat. No. 4 2943/67.

The following examples further illustrate this invention:

EXAMPLE 1

Preparation of N-(N'-Carbobenzyloxyalanyl)-β-(3,4-dihydroxyphenethylamine)

The N-hydroxysuccinimide ester of carbobenzyloxy dopamine (6.1 g, 0.020 mole) (J.A.C.S. 86, 1839 (1964) was added to 3.8 g. of dopamine hydrochloride dissolved in 30 ml. of dimethylformamide (DMF). The reaction mixture was stirred, 8 ml. of triethylamine was added, and the reaction was stirred for 3 to 4 hours.

EXAMPLE 2

Preparation of N-3',4'-Dihydroxy-β-phenethyl-L-alanine amide

N'-3',4'-dihydroxy-β-phenethyl-L-phenylalanine amide, m.p. 278°–283°C was prepared by hydrogenating 20 g. of N-(N'-carbobenzyloxyalanyl)-β-(3,4-dihydroxyphenethyl amine) in 200 ml. of absolute ethanol, 1.1 eg. (equivalent) of 12 n HCl and 10 percent catalyst ratio using 5 percent palladium on carbon as the catalyst. The hydrogenated reaction was filtered, the ethanol stripped, and the residue azeotroped with ethanol to remove the excess hydrochloric acid. The residue was taken up in a minimum amount of methanol, and the product precipitated with Et₂O.

EXAMPLE 3

Preparation of the N-hydroxy succinimide ester of N-carbobenzyloxy-1-isoleucine

In a clean reactor charged with 20 liters of dry dioxane were added 2,653 gms. of N-carbobenzyloxy-1-isoleucine and 1151 gms. of N-hydroxysuccinimide. The reaction mixture was heated to 40°C. with agitation to effect solution. In a separate vessel, 2,060 gms. of dicyclohexylcarbodiimide were dissolved in 6 liters of dry dioxane by heating the mixture to a temperature of from 35°–40°C. The dicyclohexylcarbodiimide solution was added rapidly with agitation, to the reaction mixture. The temperature was maintained at 40°–45°C. for 16 hours, cooled to 20°C. and the solids (dicyclohexylurea) were filtered off and the cake washed 2–3 times with dioxane. The filtrate and washes were combined and transferred to a reactor suitable for vacuum stripping. The reaction was vacuum stripped to a thick syrup at a maximum temperature of 60°C. The vacuum was released, 20 liters of isopropanol were added and the reaction was heated to 60°–70°C. to dissolve the solids. The solution is filtered, cooled to 10°–15°C. with agitation and maintained at 10°–15°C. for 3 hours. The precipitate was centrifuged, washed with a small amount of cold isopropanol and vacuum dried at 45°C. to yield 3100 gms. of the desired intermediate.

EXAMPLE 4

Preparation of N-Carbobenzyloxy-L-isoleucyl-β-3,4-dihydroxyphenethyl amine

Dimethylformamide (15 liters), 1991 gms. (10.5 moles) of the above prepared N-hydroxysuccinimide ester of N-carbobenzyloxy-1-leucine were placed under a nitrogen purge and heated to 40°C. Triethylamine (3000 gms., 29.74 moles) were added and the reaction was agitated for 16 hours at 40°C. The reaction was cooled to 20°C. and 2.5 liters of cold water was added to the reaction, followed by the addition of 40 liters of a 0.5 percent sodium bisulfite solution. The reaction was agitated for 30 minutes, allowed to settle for one hour and the aqueous layer was separated off, followed by reextraction twice with 10 liters of ethyl acetate. The ethyl acetate extractions were combined and washed three times with 15 liters of 0.5 percent sodium bisulfate solution. Anhydrous sodium sulfate (15 lbs.) and 4 lbs. of Darco6-60 charcoal were added to the ethyl acetate solution. The mixture was slurried for 2 hours, filtered, the filtrate was transferred to a ractor suitable for vacuum-stripping and the ethyl acetate was stripped in vacuo at a maximum temperature of 60°C. Benzene (30 liters) was added and the reaction heated to about 50°C. until dissolution was effected. The reaction was cooled to 15°–20°C. and stirred for 6–8 hours, centrifuged, washed with a small amount of benzene and vacuum dried at 45°C. to yield the desired crude product.

EXAMPLE 5

Preparation of 3,4-Dihydroxy-β-phenethyl-L-isoleucyl amide

Four g. of the above-prepared N-carbobenzyloxy-L-isoleucyl β-3,4-dihydroxy phenethylamine was taken up in 100 ml. of ethyl acetate and extracted with 100 ml. of 1NHCl solution. The yellow solution became nearly colorless. The ethyl acetate layer was washed three times with 100 ml. portions of distilled water. The ethyl acetate was dried over $Na_2SO_4$, filtered and concentrated in vacuo to give a glass. The glass was taken up in methanol, 100 ml., and decolorized with Darco to give a nearly colorless solution. This solution was concentrated in vacuo to give a glass. The glass was taken up in a minimum of ether and allowed to stand at room temperature to give 3.6 g. of the product as white needle like crystals, m.p. 105°–107°.

We claim:

1. The method of synthesizing an amino acid amide of dopamine of the formula

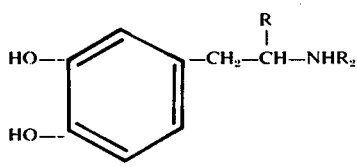

wherein R is hydrogen or loweralkyl and $R_2$ is derived from an amino acid selected from the group consisting of β-alanine, β-methylalanine, phenylalanine, 3,4-dihydroxyphenylalanine, 4-chlorophenylalanine, glycine, tyrosine, valine, leucine, iso-leucine, serine, threonine, cysteine, methionine, tryptophane, aspartic acid, glutamine, arginine, lysine, histidine, γ-aminobutyric acid, pyroglutamic acid, alanine, proline, sarcosine, N-methylpiperazinobutyric acid, or

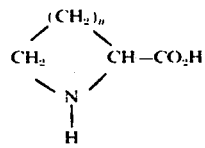

wherein n is an integer from 1 to 4, the improvement comprising the steps of reacting the N-hydroxysuccimide ester of the appropriate N-carbobenzyloxy amino acid with dopamine or a salt thereof, and cleaving the N-carbobenzyloxy group to obtain the amino acid amide.

2. The method of claim 1 wherein said ester is reacted with dopamine or a salt of dopamine at a temperature of from about 20° to about 50°C. or from about 3 to about 20 hours to obtain N-carbobenzyloxy amino acid amide of dopamine.

3. The method of claim 2 wherein the N-carbobenzyloxy protecting group is cleaved by hydrogen reduction.

* * * * *